Oct. 30, 1951  A. URFER  2,573,515
MARINE SPEED INDICATOR
Filed Nov. 20, 1947  3 Sheets-Sheet 1

INVENTOR.
Adolf Urfer
BY
Morgan, Finnegan & Durham
ATTORNEYS.

Oct. 30, 1951

A. URFER 2,573,515

MARINE SPEED INDICATOR

Filed Nov. 20, 1947

INVENTOR.
Adolf Urfer

BY
Morgan, Finnegan & Durham
ATTORNEYS.

Patented Oct. 30, 1951

2,573,515

UNITED STATES PATENT OFFICE 2,573,515

MARINE SPEED INDICATOR

Adolf Urfer, Lake Oscawana, Putnam Valley, N. Y.

Application November 20, 1947, Serial No. 787,091

1 Claim. (Cl. 73—407)

The present invention relates to a speed indicator of the fluid pressure type and is adapted particularly to marine uses.

Objects and advantages of the invention will be set forth in part hereinafter and in part will be obvious herefrom, or may be learned by practice with the invention, the same being realized and attained by means of the instrumentalities and combinations pointed out in the appended claim.

The invention consists in the novel parts, constructions, arrangements, combinations and improvements herein shown and described.

The accompanying drawings, referred to herein and constituting a part hereof, illustrate one embodiment of the invention, and together with the description, serve to explain the principles of the invention.

The present invention has for an object the provision of a sturdy and accurate speed indicator of the fluid pressure type which is particularly adapted for marine use to indicate the speed of a ship through the water. Another object is the provision of a speed indicator of the type mentioned which functions with great accuracy despite the roll or pitch of the ship in the water. The invention provides a speed indicator particularly adapted for marine use which measures the differential pressure between the dynamic and static heads of the water through which the ship is travelling and indicates the same in speed units, the differential pressure being measured by means of separate pressure responsive systems of substantially equal volumes, in order to obtain accurate readings under varying conditions to be expected.

Figure 4:
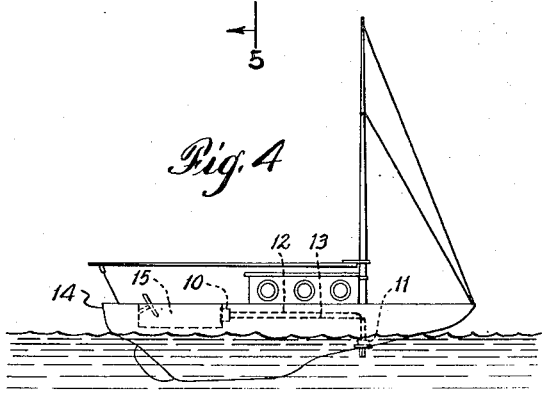
Fig. 4 is a side elevation of a sailing ship showing the position of installation thereon of the speed indicator of the present invention.

Referring now in detail to the illustrative embodiment of the invention shown by way of example in the accompanying drawings, the speed indicator comprises generally the pressure gauge element 10 (Fig. 1), the pressure heads or nozzles 11, and the interconnecting static and dynamic pressure tubes 12 and 13 respectively. The illustrative assembly of the speed indicator with the elements mentioned on a sail boat 14 is shown in Fig. 4, the pressure gauge element 10 being mounted in the cock pit 15 of the boat and the pressure nozzles 11 being mounted centrally of the hull and forward, interconnected by tubes 12 and 13 within the hull as shown.

Figure 1:
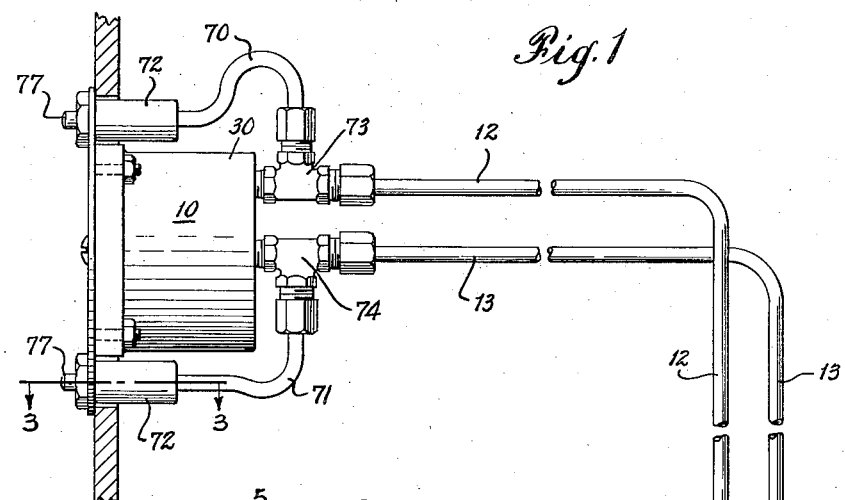
Fig. 1 is a side elevation, certain parts being broken away for greater clarity, of a speed indicator embodying the present invention, showing the principal elements thereof including the pressure heads, the pressure gauge, and the interconnecting tubes.

As shown in Fig. 1 the pressure nozzle assembly 11 comprises a fitting 16 suitably secured to the inside surface of the hull 17 of the vessel and having an extension portion 18 extending through an aperture in the hull which serves as a mounting for the Pitot tube 19 and the static tube 20. The Pitot tube 19 is provided with an orifice 21 toward the lower end thereof and said orifice is directed toward the front of the vessel, that is, in the direction of travel thereof, in order to receive the impact or dynamic head of the water. The static tube 20 is provided with a similar orifice 22 directed rearwardly of the vessel in order to receive and communicate through the tube the static head of the water.

As shown, the tubes 19 and 20 are securely set in the extension portions 18 of fitting 16 to communicate with passages 23 and 24 therethrough, which, at their other ends, communicate with the tubes 13 and 12, secured in the fitting by suitable threaded unions 25 and 26.

Figure 5:
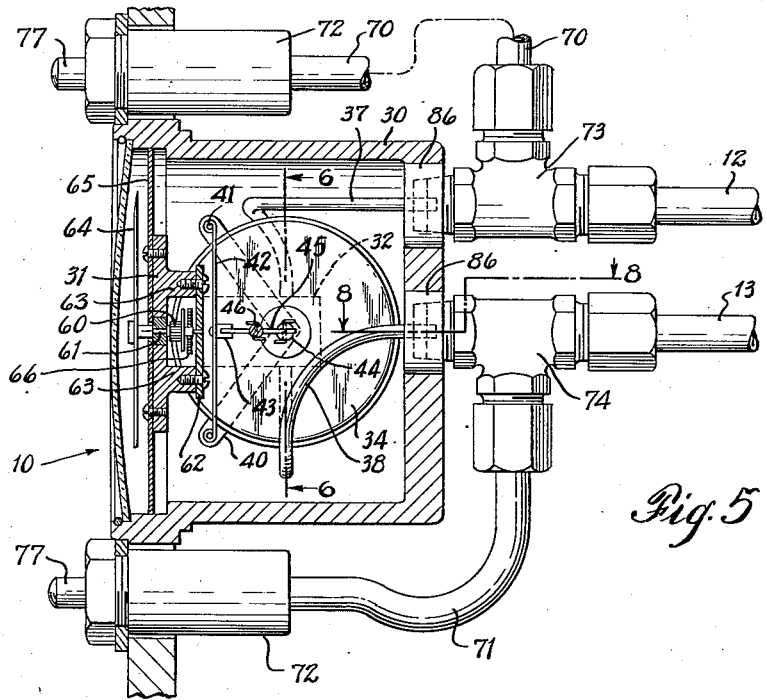
Fig. 5 is a cross-sectional view of the pressure gauge element of the speed indicator of the invention taken along line 5—5 of Fig. 2.
Figure 6:
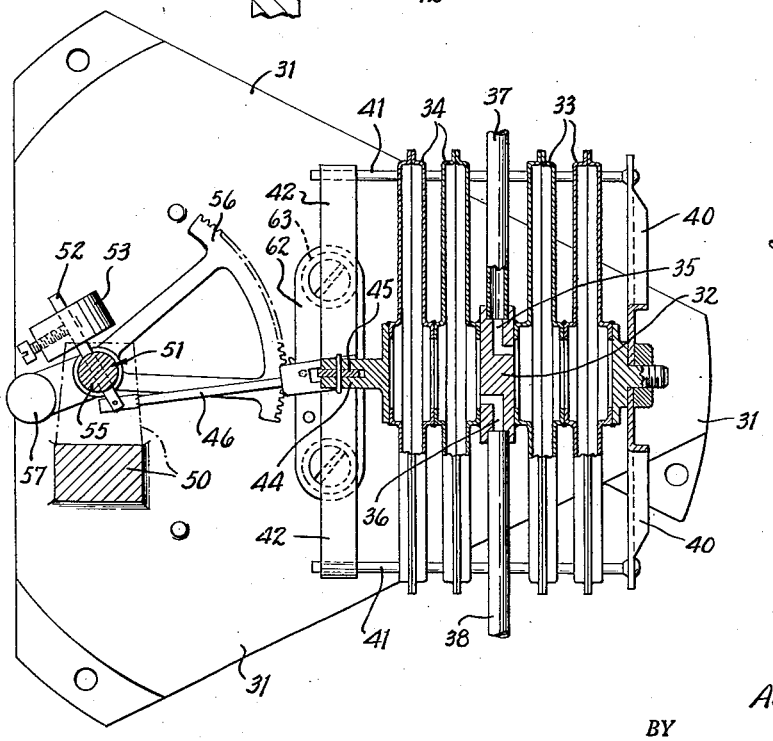
Fig. 6 is a cross-sectional view taken along line 6—6 of Fig. 5.
Figure 7:
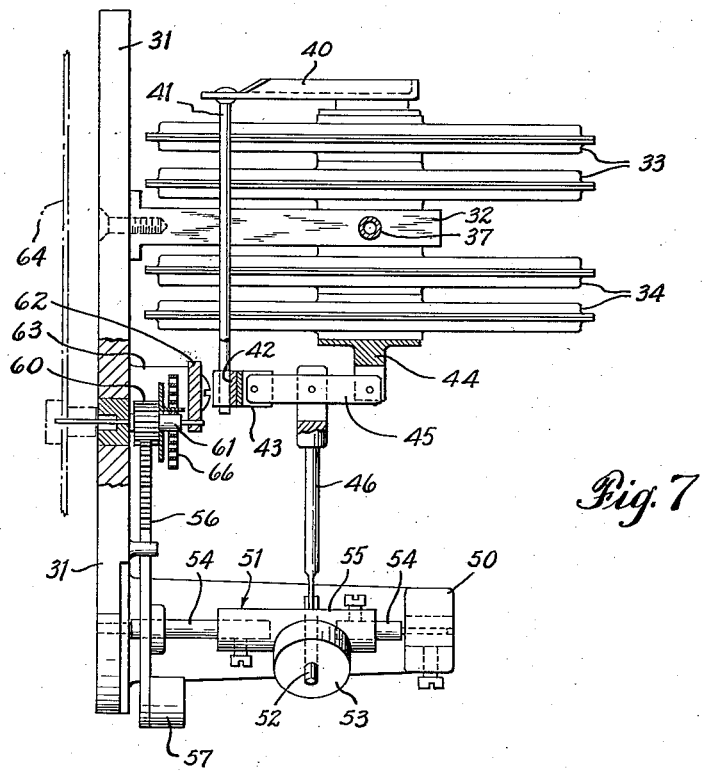
Fig. 7 is a side elevation, partly in central section, of the operative parts of the pressure gauge element shown in the preceding figures.

The dynamic and static pressures or heads of the water through which the vessel is travelling is communicated to the pressure gauge element 10 of the speed indicator of the invention through the tubes 13 and 12 and are received there in respective expansive Sylphon bellows which are mechanically interconnected and operate to indicate by a pointer the pressure difference of the pressure heads. As best shown in Figs. 5, 6 and 7, the gauge element 10 comprises a suitable cylindrical casing 30 having secured therein a triangular base plate 31 which carries a support 32 extending at right angles therefrom. Secured to opposite surfaces of the support 32 are the preferably metallic Sylphon bellows 33 and 34 and communication with the interior thereof is established through ducts 35 and 36 in support 32. Short tubing elements 37 and 38 within the casing 30 communicate with the bellows 33 and 34 respectively and at their other ends with the static and dynamic head tubes 12 and 13 respectively through fittings at the back of the casing which will be hereinafter described.

The means for integrating the pressure induced movements of the opposed end diaphragms of the bellows 33 and 34 comprise a V-shaped yoke 40 secured to the free end of bellows 33 and carrying rigidly at its arm ends the rods 41 extending generally in the direction of the axis of the bellows members and along the length thereof. At their ends adjacent the free end of bellows 34 the rods 41 are rigidly connected by a flat strip of material 42 which serves as a support centrally thereof for a bifurcated connection arm 43. A similar arm 44 is secured to the end diaphragm of bellows 34 and a link 45 is pivotally connected at either end to said arms.

At the mid-point of the length of link 45 there is pivotally connected thereto a link 46 which transfers to an indicating pointer movements of the center point of link 45, said movement being a function of the pressure difference of the static and dynamic pressures as exerted on the bellows 33 and 34. As shown, an L-shaped supporting arm 50 extends normally outwardly from the plate 31, and in the head thereof and the plate there are journalled the ends of a rotatable shaft 51 compositely formed by spindle elements 54 adjustably secured in an intervening sleeve 55. A short shaft 52 extends through and is fast in the said sleeve 55, and is pivotally connected at one end to shaft 46 carrying at its other an adjustable counterbalancing weight 53. Adjacent an end of the shaft 51, that is, on one of the spindle elements 54, there is fixed for rotation therewith a gear sector 56 having a rearward extension comprising an integral counterbalancing weights 57. The weights 53 and 57 are provided in order to insure accurate movements of the gauge members described regardless of the position the gauge may take in use.

Figure 2:
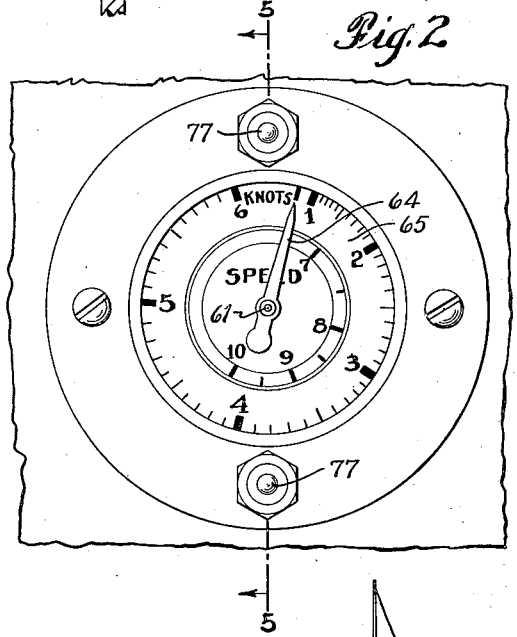
Fig. 2 is a front elevation of the pressure gauge shown in Fig. 1 showing the calibrated dial and indicating finger thereof.
Figure 9:
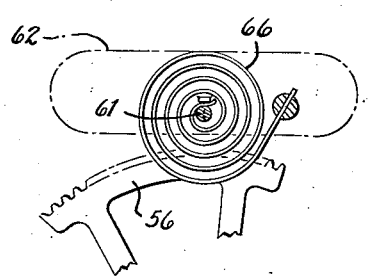
Fig. 9 is a schematic view of certain portions of the pressure gauge element shown in the preceding figures.

Longitudinal movements of the link 46 are thus translated through shaft 51 into rotary movements of gear sector 56, and the latter is in mesh with a pinion 60 fixed on shaft 61. The shaft 61, with suitable bearing means as shown, is journalled in a cross head 62 extending between and affixed to a pair of extensions or bosses 63 of base plate 31, and the other end of said shaft is journalled in and extends through said base plate. The free end of shaft 61 extending to the opposite side of the base plate carries a pointer 64 whereby the rotary movements of shaft 61 received from the gear sector 56 may be indicated on a dial face 65, which is affixed to base plate 31 and calibrated in speed units such as knots, for instance, as shown in Fig. 2. A coiled hair spring 66 interconnects the rotatable shaft 61 and the stationary cross head 62, as shown in detail in Fig. 9 of the drawings, and rotation of the shaft to advance the pointer 64 in response to the pressure differences in bellows 33 and 34 expands said spring, which exerts an opposing force tending to maintain the various moving elements described in a constant engaged relationship for greater accuracy and to return the pointer to its normal position at zero.

Figure 3:
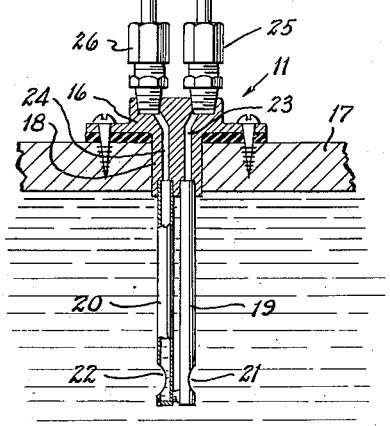
Fig. 3 is a detail cross-sectional view of an exhaust or hand release valve taken along line 3—3 of Fig. 1.

Exhaust valve means are provided for opening the pressure lines 12 and 13 to atmosphere when desired to reset the pressure gauge element to zero and, as shown in Fig. 1, comprises lines 70 and 71 connecting identical valves 72 and T connections 73 and 74 in the lines 12 and 13 respectively. The valves 72 are preferably set in a supporting panel adjacent the casing 30 of the pressure gauge element and each comprises, as shown in detail in Fig. 3, a hollow casing 75 having a threaded plug 76 in one end in which the line 70 or 71 is fixed. A plunger 77 extends from the other end of the bore of casing 75 and carries a sealing shoulder 78 to abut a casing shoulder 79 to seal the exit except when plunger 77 is longitudinally displaced. A guide member 80 is threadedly engaged in the bore of casing 75, serves as a guide for plunger 77 and a support for coiled spring 81 tending to bias the plunger 77 toward closed position, and is apertured at 82 to provide free communication through the casing 75.

Figure 8:
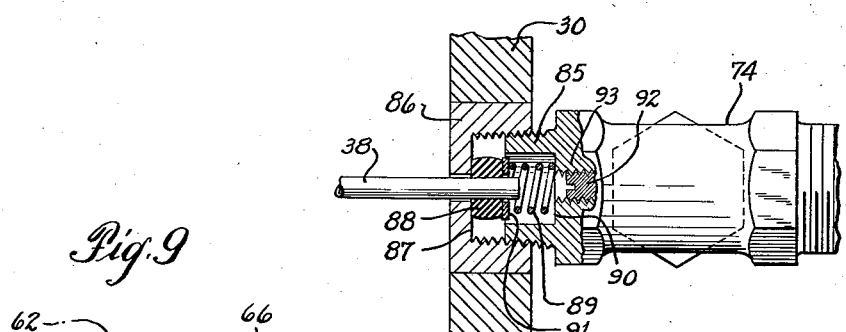
Fig. 8 is a detail view partly in elevation and partly in cross section taken along line 8—8 of Fig. 5.

The T connections 73 and 74 also interconnect the tubes 12 and 13 with the tubes 37 and 38 within the gauge casing 30, and the detailed structure for connection 74 is shown in Fig. 8 of the drawings. A threaded nipple portion 85 is adapted to be screwed into an aperture in a portion 86 of the back wall of casing 30 of the pressure gauge. A smaller aperture serves to accommodate the tube 38 from within the casing, and a shoulder 87 between the apertures serves as a seat for an annular, preferably flexible, packing washer 88 tightly surrounding tube 38. A coiled spring 89 seated on a shoulder 90 within the bore of nipple 85 and against the end of packing washer 88, with an intervening contact washer 91, maintains a resilient pressure against packing 88 to seal the tube with respect to the casing 30.

A screw 92 is threaded into a reduced portion 93 of the bore of the T connection 74 and provided with flattened threads or otherwise formed for a sloppy fit, said screw restricting fluid communication through the connection and serving to protect the bellows and other parts of the gauge from sudden large changes in pressure communicated thereto.

In the speed indicator shown and described the individual fluid systems connected to the Pitot and static tubes 19 and 20 respectively are formed to be of substantially equal volumes, so that variations in pressure heads on the tubes brought about by pitch and roll of the vessel in choppy or stormy water will result in substantially equal effects upon the bellows members of the pressure gauge, such effects being cancelled out and prevented from reaching the indicating pointer 64. Thus, the bellows 33 and 34, their corresponding connecting tubes 12 and 13, 37 and 38, 70 and 71, as well as the pressure head tubes 20 and 19 are provided in substantial duplicates so that the volumes of the systems are the same and inaccuracy and agitation of the dial indication of speed is avoided at all times.

The invention in its broader aspects is not limited to the specific mechanisms shown and described but departures may be made therefrom, within the scope of the accompanying claims, without departing from the principles of the invention and without sacrificing its chief advantages.

What I claim is:

A speed indicator for marine vessels comprising, in combination, a pair of horizontally arranged bellows elements in substantially axial alignment having fixed ends adjacent to each other and other ends movable in respectively opposite directions each said element being responsive to pressure increases or decreases from individual sources, an indicator, and means interconnecting said other ends and indicator for positioning the indicator in accordance with pressure differences in said bellows elements, said means including a member secured with respect to said other end of one of said elements, extending along the length of said pair of elements and having a free end substantially aligned with said other end of the other said element, a horizontally arranged link pivotally interconnected with said free end of said member and said other end of said other element, a horizontally disposed shaft transverse to the axes of said bellows elements carrying said indicator, and means for translating displacements of the midpoint of said link into rotary motion of said shaft said last means including a pinion on said shaft, a second horizontally arranged shaft transverse to the axes of said bellows elements said second shaft having a crank arm and a gear sector thereon and a counterbalance for said sector, said gear sector meshing with said pinion, and a second link pivotally interconnecting the midpoint of said first link and said crank arm.

ADOLF URFER.

REFERENCES CITED

The following references are of record in the file of this patent:

UNITED STATES PATENTS

| Number | Name | Date |
|---|---|---|
| 2,265,045 | Pfeiffer | Dec. 2, 1941 |
| 2,362,298 | Newell | Nov. 7, 1944 |
| 2,450,772 | Watkins | Oct. 5, 1948 |

FOREIGN PATENTS

| Number | Country | Date |
|---|---|---|
| 99,284 | France | May 31, 1873 |